METHOD OF FRICTION WELDING
Filed March 6, 1967
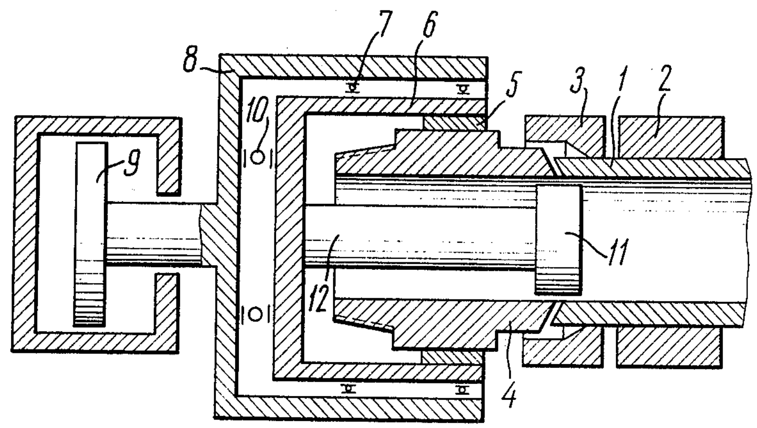
FIG. 1
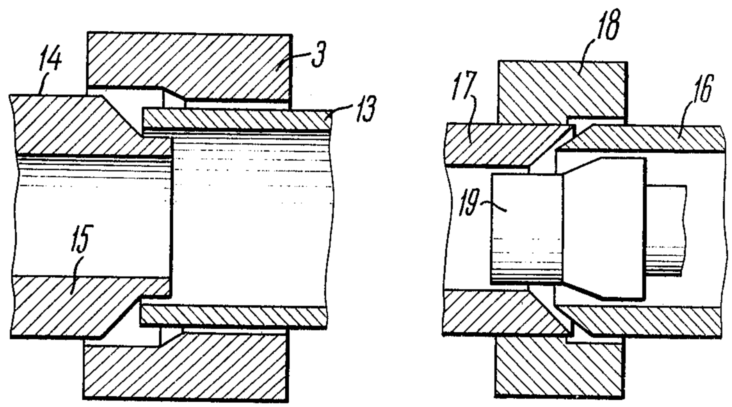
FIG. 2
FIG. 3

United States Patent Office 3,504,425 Patented Apr. 7, 1970

3,504,425

METHOD OF FRICTION WELDING

Pavel Moiseevich Sutovsky, Ulitsa Tolstogo 193, kv. 56; Mamed Abdul Ragim Ogly Ashrafov, Ulitsa Sameda Vurguna 3, kv. 1; Gamid Emin Ogly Efendiev, Pr. Neftyanikov 87, kv. 26, all of Baku, U.S.S.R.; Baba Abaskuli Ogly Akhmedov, Ulitsa Lenina 23, kv. 22, Sumgait, U.S.S.R.; Vladimir Ivanovich Timofeev, Ulitsa Kamo 186, kv. 32; and Tovy Noevich Kornev, Ulitsa Mamedalieva 12, kv. 16, both of Baku, U.S.S.R.; Alexandr Shmulevich Gelman, 3 Tverskaya Yamsaya ulitsa 42/8, kv. 23, Moscow, U.S.S.R.; and Mamed Mekhti Mirza Aga Ogly Guseinzade, Ulitsa Nizami 103, kv. 49, Baku, U.S.S.R.

Filed Mar. 6, 1967, Ser. No. 620,996
Int. Cl. B23k *27/00*
U.S. Cl. 29—470.3 6 Claims

ABSTRACT OF THE DISCLOSURE

A method of welding especially useful in welding such items as pipe to screw couplings having different cross-sectional friction areas, in which the parts to be joined are enclosed in a casing commensurate with the final desired shape of the joint and the parts are heated by rotary friction to raise the parts to upsetting and welding temperature. The smaller cross-sectional friction area is upset so that it is substantially equal to the larger, and the parts are welded. An interior mandrel may be used as required.

The present invention relates to methods of non-detachable joining of parts (blanks), and more specifically to friction welding of blanks of various cross-sectional areas.

Methods of welding blanks are known wherein in order to provide the qualitative joining thereof, recourse is had to a preliminary increase in the cross-sectional area of a smaller blank up to the cross-sectional dimensions of a larger one, followed by their welding together. Thus, for example, when manufacturing pipes for the petroleum industry, to provide for the mechanical strength of the welded joint to be equal to that of the base metal of a pipe recourse is had to upsetting or overturning the ends of the pipes before their welding. The upsetting of the pipe ends is performed on special appliances (hydraulic presses or horizontal forging machines) with the use of a preheat step. Upon completion of the upsetting operation, machining is performed, consisting in facing the butts and turning the cylindrical portion of the upset end of the pipe.

Such operations complicate the manufacturing of pipes and require the application of unique equipment.

Also, with resistance butt-welding or friction welding of a pipe provided with a connecting end there is formed a burr due to the plasticity of the welding joint and distortions of fibers in the welded joint.

An object of the present invention is to eliminate the foregoing disadvantages.

Another object of the invention is to provide a method of friction welding of blanks with various cross-sectional areas, which is accomplished with relatively simple equipment and a small loss of time.

A further object of the present invention is to provide a method of friction welding of blanks ensuring a strong welded joint between the blanks.

In conformity with the above and other objects, the present invention consists in a method of friction welding of blanks with various cross-sectional areas wherein portions of blanks to be welded, having the shape of bodies of revolution, are enclosed in a casing. Simultaneously there is effected the upsetting of a blank with a smaller cross-sectional area, limited by said casing, followed by welding it with a blank of larger cross-sectional area.

When welding blanks having portions to be welded of tubular shape, it is expedient that a mandrel, to be placed in the welding zone, be introduced inside the blanks coaxially with the casing.

Other objects and advantages of the present invention will become more fully apparent from a consideration of the following description of various embodiments of the proposed method, taken in conjunction with the appended drawings, in which:

FIG. 1 is a cross-sectional view of a device for performing the method of friction welding of blanks with portions to be welded of tubular shape;

FIG. 2 is a cross-sectional view of blanks and their arrangement in a casing when welding with an external upsetting; and FIG. 3 is a cross-sectional view of blanks and their arrangement together with a mandrel in the casing with a view of obtaining internal upsetting.

A pipe 1 (FIG. 1) is placed in a non-rotating clamp 2. A casing 3 is rigidly secured on the pipe 1 in its welding area.

The connecting end 4, which may be a threaded pipe coupling having a larger cross-sectional area than the pipe 1, is secured in a clamp or chuck 5 rigidly connected to a spindle 6. The spindle 6 rotates in bearings 7 provided in a body 8. An axial force, set up by a hydraulic cylinder 9 during the welding process, is absorbed by a thrust bearing 10.

A mendrel 11, placed in the welding area coaxially with the casing 3, is introduced inside the connecting end 4 and the pipe 1. Both the casing 3 and mandrel 11 are made of a heat-resisting wear-proof material.

The mandrel 11 is rigidly mounted on a shaft 12 which is connected to the spindle 6 and rotates synchronously therewith.

The end of the pipe with a smaller cross-sectional area in the area to be welded has a conical shape (pipe 1 in FIG. 1), or that of a flat butt (pipe 13 in FIG. 2).

To provide for an increased welding area and oriented flow of material of the pipe 1, the area of the connecting end 4 to be welded is also conical.

In general, the shape of the surfaces of the blanks to be welded is selected according to their material and geometrical dimensions.

The casing 3 may be designed in one piece with the clamp 5. It is practicable to make the casing 3 both according to a detachable and one-piece designs.

The mandrel 11 may be freely fitted on the shaft 12.

In welding onto the pipe 13 (FIG. 2) the connecting end 14, having a considerably smaller internal diameter than said pipe. An extension or shank 15 entering inside the pipe 13 functions as the mandrel.

The welding operation is performed as follows.

The connecting end 4 is rotated by chuck 5 and is displaced in the axial direction by means of the hydraulic cylinder 9. As a result of friction, heat is generated in the to-be welded joint. The pipe 1 with thinner walls is heated at a faster rate than the connecting end 4.

As a result, plastic deformation of the material of the pipe 1, occurs and the material flows along the conical butt end of the connecting end 4 into a space between the connecting end 4 and the internal surface of the casing 3.

The area of contact of the conical butt of the connecting end 4 with the material of the pipe 1 to be upset gradually becomes larger, and the axial force increases until the material to be upset fills the whole space between the connecting end 4 and the internal surface of the casing 3.

The internal surface of the casing 3 has a shape which ensures the upsetting operation will only be performed until the dimensions required are obtained (an increase in the thickness of pipe walls within the welding area).

The inward deformation of the material of parts to be welded is prevented by the mandrel 11 (FIG. 1) or by shank 15 of the connecting end 14 (FIG. 2). Where the thickness of the shank 15 of the connecting end 14 is found to be insufficient, the mandrel 11 is also employed.

Upon the completion of the pipe upsetting and filling of the whole space between the connecting end 4 and internal surface of the casing 3, heating is increased by increasing the axial force, which provides for an accelerated local heating of the surfaces to be welded.

On raising the temperature of the surfaces to be welded to a value required for welding, as is usual with friction welding, recourse is had to a deceleration of rotation and upsetting thereof with a high specific pressure in the welded joint.

Then the clamp 5 of the connecting end 4 is opened and, due to a reverse run of the hydraulic cylinder 9, the mandrel 11 is removed from the welded part which is retained by the aid of the clamp 2.

FIG. 3 represents the blanks and their arrangement together with the mandrel in the casing so as to bring about the internal upsetting thereof.

Portions to be welded of a pipe 16 and connecting end 17 with similar external diameters are machined in such a manner as to provide external and internal cones. The butt end of the pipe 16 may be of any shape similar to that which has been described above.

The deformation of the connecting end 17 in the outward direction is limited by a casing 18 connected therewith, the internal diameter of said casing being approximately equal to the diameter of parts to be welded.

The mandrel 19 has a shape providing the internal upsetting to be performed until the dimensions required are obtained.

In this case, any of parts to be welded may be the part rotated.

The welding, as performed according to said method, results in the manufacture of high-quality welded joints due to the provision of a larger welding surface and only a small bending of the fibers in the welded joint.

To improve the quality of the welded joint when welding hardenable materials and to increase the service life of the mandrel and casing, it is expedient that they be cooled.

Said method may be employed for welding, not only blanks having parts to be welded of tubular shape, but also solid bodies of revolution. In such a case, only the casing is to be employed.

For describing the invention, a concise terminology has been used; yet it is evident that there may be employed members operating in the similar manner.

Though the present invention is described in connection with its preferred embodiment, it is evident that there may be variants and modifications that can be easily understood by those skilled in the art.

What is claimed is:

1. In a method of friction welding parts having different cross-sectional friction areas wherein at least one part is tubular by simultaneously relatively rotating said parts and forcing them together, the improvement comprising the preliminary steps of enclosing said areas of said parts to be friction welded with means which, in cooperation with said parts, defines an annular cavity; rotating said parts relative to each other and simultaneously axially forcing said areas of the parts into contact to heat said area and plastically flow the material of the part of smaller cross-sectional area into said cavity thereby forming cross-sectional friction areas on said parts which are substantially equal; then continuing said relative rotating and axial pressure to friction weld said parts together.

2. In a method as claimed in claim 1 wherein both parts are tubular and said enclosing means are an outer casing and an inner mandrel.

3. In a method as claimed in claim 2 wherein said casing and mandrel are coaxial with said parts, and said plastic flow is radially outwards.

4. In a method as claimed in claim 2 wherein said casing and mandrel are coaxial with said parts, and said plastic flow is radially inwards.

5. In a method as claimed in claim 1 wherein both parts are tubular and the part of larger cross-sectional friction area has an axially extending annular flange adjacent the tubular surface of the other part, and said enclosing means is a casing on the opposite-to-the-flange side of said larger area part.

6. In a method as claimed in claim 1 wherein said areas of the parts are mating conical areas.

References Cited

UNITED STATES PATENTS

| | | | |
|---|---|---|---|
| 2,795,039 | 6/1957 | Hutchins | 29—470.3 |
| 3,175,284 | 3/1965 | Cotovsky | 29—498 |
| 3,235,312 | 2/1966 | Hollander | 29—470.3 |
| 3,273,233 | 9/1966 | Oberle et al. | 29—498 |
| 3,323,203 | 6/1967 | Hollander | 29—470.3 |

FOREIGN PATENTS

| | | |
|---|---|---|
| 875,603 | 8/1961 | England. |

JOHN F. CAMPBELL, Primary Examiner

U.S. Cl. X.R.

29—475; 228—2